United States Patent
Hamaguchi (10) Patent No.: US 11,565,740 B2
(45) Date of Patent: Jan. 31, 2023

(54) STEERING DEVICE

(71) Applicant: Hitachi Astemo, Ltd., Hitachinaka (JP)

(72) Inventor: Yusuke Hamaguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/307,531

(22) Filed: May 4, 2021

(65) Prior Publication Data
US 2021/0269084 A1 Sep. 2, 2021

Related U.S. Application Data (63) Continuation of application No. PCT/JP2018/044406, filed on Dec. 3, 2018.

(51) Int. Cl.
*B62D 5/04* (2006.01)
*B62D 3/12* (2006.01)

(52) U.S. Cl.
CPC ........... *B62D 5/0403* (2013.01); *B62D 3/126* (2013.01); *B62D 5/0421* (2013.01)

(58) Field of Classification Search
CPC .......... B62D 5/0403; B62D 5/04; B62D 5/00; B62D 5/0406; B62D 3/126; B62D 5/001; B62D 5/0421; B62D 5/0409; H02K 5/04; H02K 5/10

See application file for complete search history.

(56) References Cited

U.S. PATENT DOCUMENTS 6,170,275 B1  1/2001 Ueno et al.
6,823,962 B2 * 11/2004 Iwasa ................ F16H 55/20
                                                    180/444

(Continued)

FOREIGN PATENT DOCUMENTS

DE    202009011506 U1 * 5/2010 ......... B62D 15/0215
DE    102016000014 A1 * 7/2016 ........... B62D 5/0421

(Continued)

OTHER PUBLICATIONS

International Search Report dated Mar. 5, 2019 for the corresponding PCT International Patent Application No. PCT/JP2018/044406.

*Primary Examiner* — Paul N Dickson
*Assistant Examiner* — Matthew D Lee
(74) *Attorney, Agent, or Firm* — Leason Ellis LLP; Edward J. Ellis; Melvin C. Garner (57) ABSTRACT

A steering device includes: a housing including a first planar surface, the housing being configured to accommodate a part of a rack shaft; an electric motor including a second planar surface facing the first planar surface, the electric motor including a bracket configured to support a rotary shaft; a tightening member configured to tighten the housing and the bracket in a state where the first planar surface and the second planar surface are mated; and a sealing member configured to provide sealing between the housing and the bracket at a position that is closer to the rotary shaft than the tightening member is. At least one of the first planar surface and the second planar surface is formed with a recess located between the tightening member and the sealing member and depressed from the at least one of the first planar surface and the second planar surface.

10 Claims, 9 Drawing Sheets

(56) References Cited

U.S. PATENT DOCUMENTS

| | | | | |
|---|---|---|---|---|
| 2010/0116582 A1* | 5/2010 | Rho | ........................ | F16H 55/24 |
| | | | | 180/444 |
| 2011/0017542 A1* | 1/2011 | Kim | ..................... | F16C 27/066 |
| | | | | 180/444 |
| 2011/0067946 A1* | 3/2011 | Kim | ..................... | B62D 5/0409 |
| | | | | 180/444 |
| 2014/0352468 A1* | 12/2014 | Kim | ..................... | B62D 5/0409 |
| | | | | 74/409 |
| 2016/0264171 A1* | 9/2016 | Zaike | ................... | B62D 5/0421 |
| 2016/0332659 A1* | 11/2016 | Hong | ................... | B62D 5/0409 |
| 2017/0274925 A1 | 9/2017 | Kimijima | | |

FOREIGN PATENT DOCUMENTS

| | | | | | |
|---|---|---|---|---|---|
| JP | 60-005260 | Y | | 1/1985 | |
| JP | 2000-152547 | A | | 5/2000 | |
| JP | 2004114865 | A | * | 4/2004 | ........... B62D 5/0421 |
| JP | 2005255121 | A | * | 9/2005 | ............. B62D 3/123 |
| JP | 2009-213197 | A | | 9/2009 | |
| JP | 2010-226907 | A | | 10/2010 | |
| JP | 2010226907 | A | * | 10/2010 | ........... B62D 5/0421 |
| JP | 2002-137746 | A | | 8/2012 | |
| JP | 2017-177868 | A | | 10/2017 | |

* cited by examiner

STEERING DEVICE

CROSS-REFERENCE TO RELATED APPLICATION

This application is a Continuation of the International Application No. PCT/JP2018/044406 filed on Dec. 3, 2018, the content of which is incorporated herein by reference in its entirety.

FIELD OF THE INVENTION

The present invention relates to a steering device.

BACKGROUND OF THE INVENTION

An electric power steering device disclosed in Japanese Patent Application Laid-Open Publication No. 2009-213197 includes a brushless motor including: a cylindrical stator wound with a coil; a rotor including an output shaft opposing the stator; a closed-end cylindrical case accommodating the stator; and a flange fixed to a bottom plate of the case. A stator constituting an angle detector for detecting a rotational angle of the rotor is fixed to the flange at a position opposing the bottom plate of the case, and the bottom plate of the case and the flange are fastened by a fastening tool disposed in the bottom plate.

CITATION LIST

Patent Literature

Patent Literature 1: Japanese Patent Application Laid-Open Publication No. 2009-213197

Technical Problem

If water enters from between an electric motor and a housing mounted with the electric motor or if, for example, corrosion products generated after salt spray mist reach a sealing portion between the electric motor and the housing, it may cause rust of a reducer provided inside the housing or electrical failures in electrical components including the electric motor. Hence, it is desirable to prevent entry of water from between the electric motor and the housing and migration of corrosion products.

An object of the present invention is to provide a steering device that prevents entry of water from between the electric motor and the housing and migration of corrosion products.

SUMMARY OF THE INVENTION

Solution to Problem

With the above object in view, an aspect of the present invention is a steering device including: a housing including a first planar surface, the housing being configured to accommodate a part of a rack shaft; an electric motor including a second planar surface facing the first planar surface, the electric motor including a bracket configured to support a rotary shaft; a tightening member configured to tighten the housing and the bracket in a state where the first planar surface and the second planar surface are mated; and a sealing member configured to provide sealing between the housing and the bracket at a position that is closer to the rotary shaft than the tightening member is. At least one of the first planar surface and the second planar surface is formed with a recess located between the tightening member and the sealing member and depressed from the at least one of the first planar surface and the second planar surface.

Advantageous Effects of Invention

The present invention prevents entry of water from between the electric motor and the housing and prevents migration of corrosion products.

DETAILED DESCRIPTION OF THE INVENTION

Embodiments of the present invention will be described below in detail with reference to the attached drawings.

First Embodiment

Figure 1:
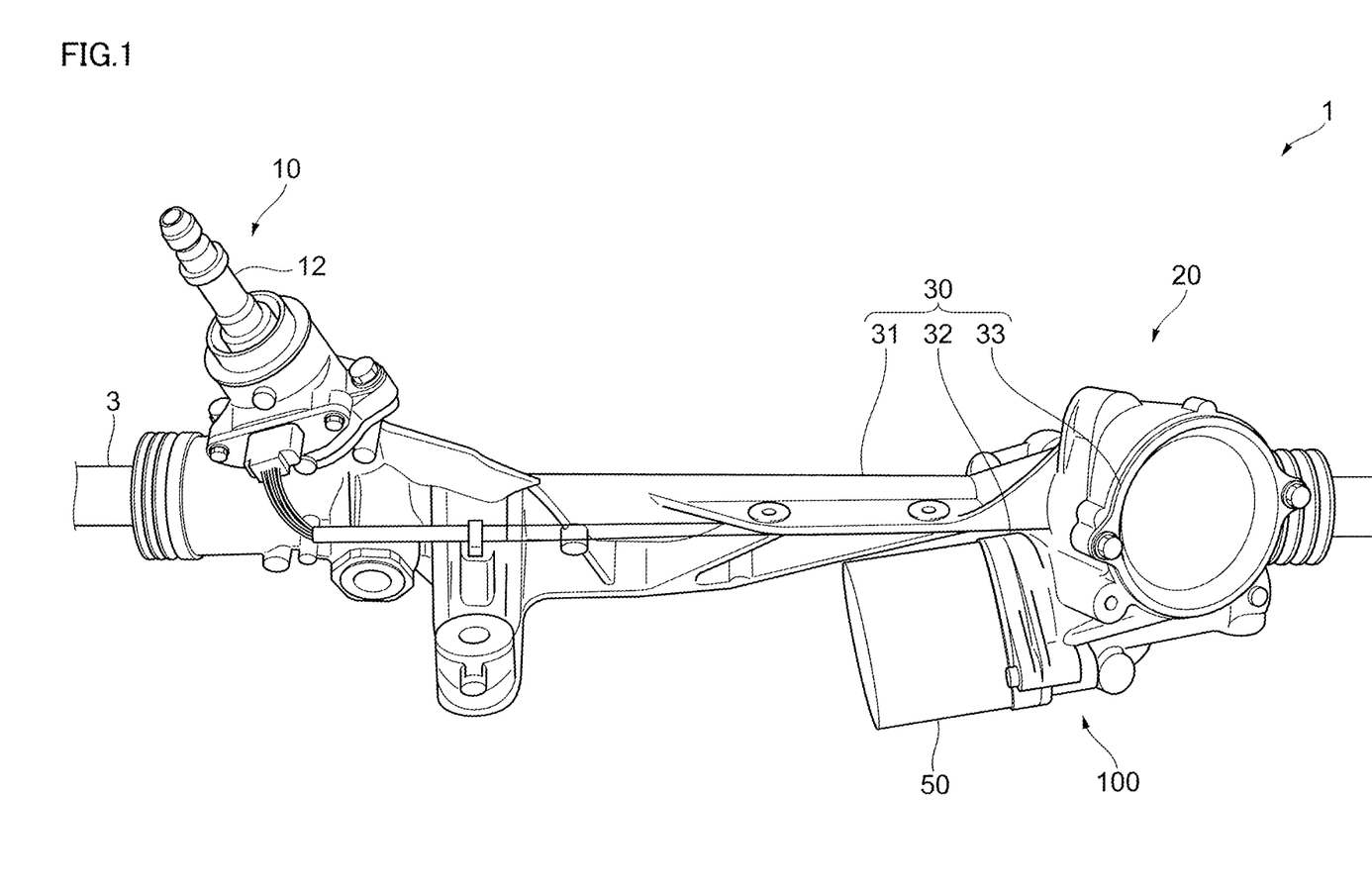
FIG. 1 depicts an entire configuration of an electric power steering device according to the first embodiment.

FIG. 1 depicts an entire configuration of an electric power steering device 1 according to the first embodiment.

Figure 2:
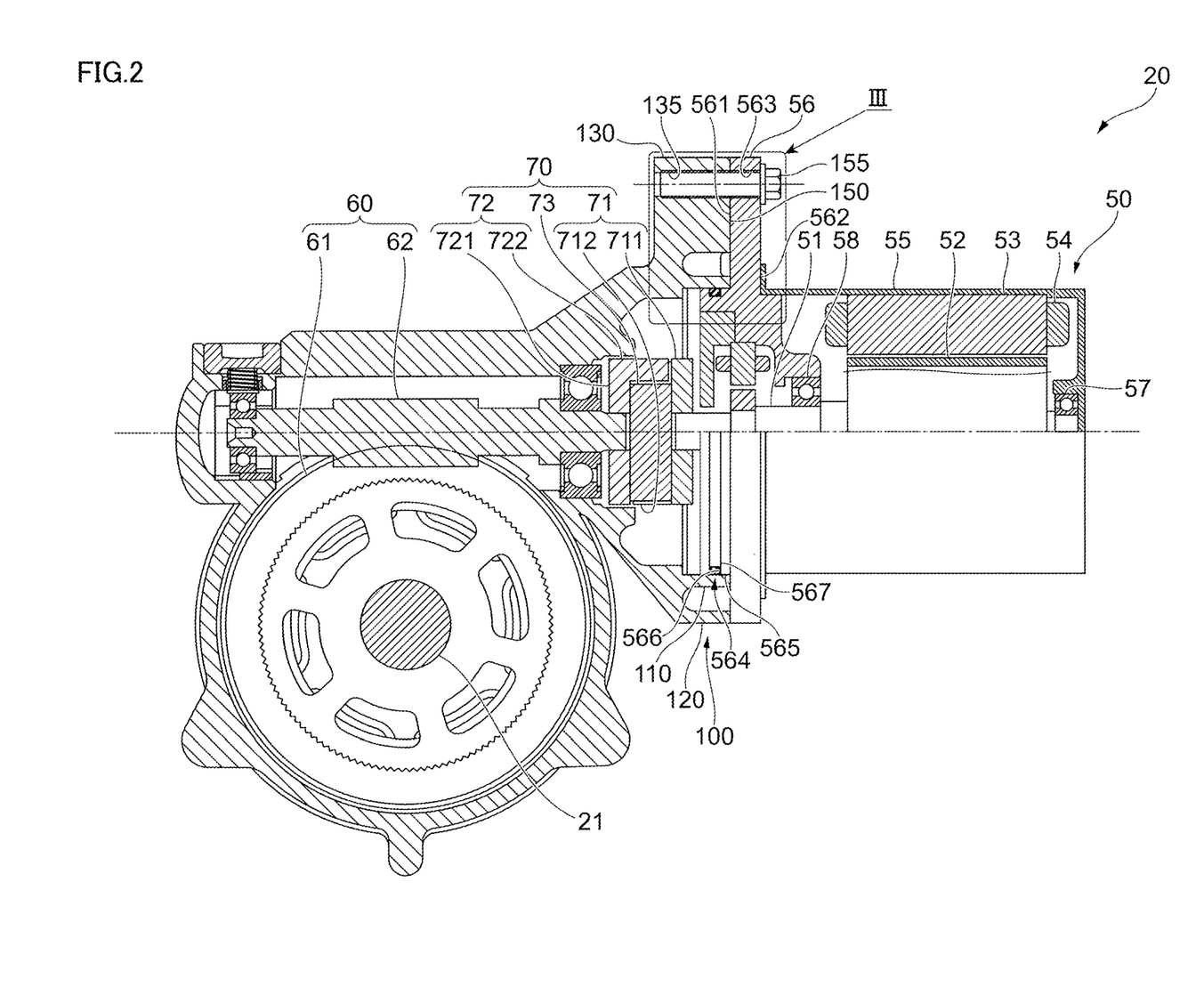
FIG. 2 is a sectional view along a rotational axis of a worm.

FIG. 2 is a sectional view along a rotational axis of a worm.

Figure 3:
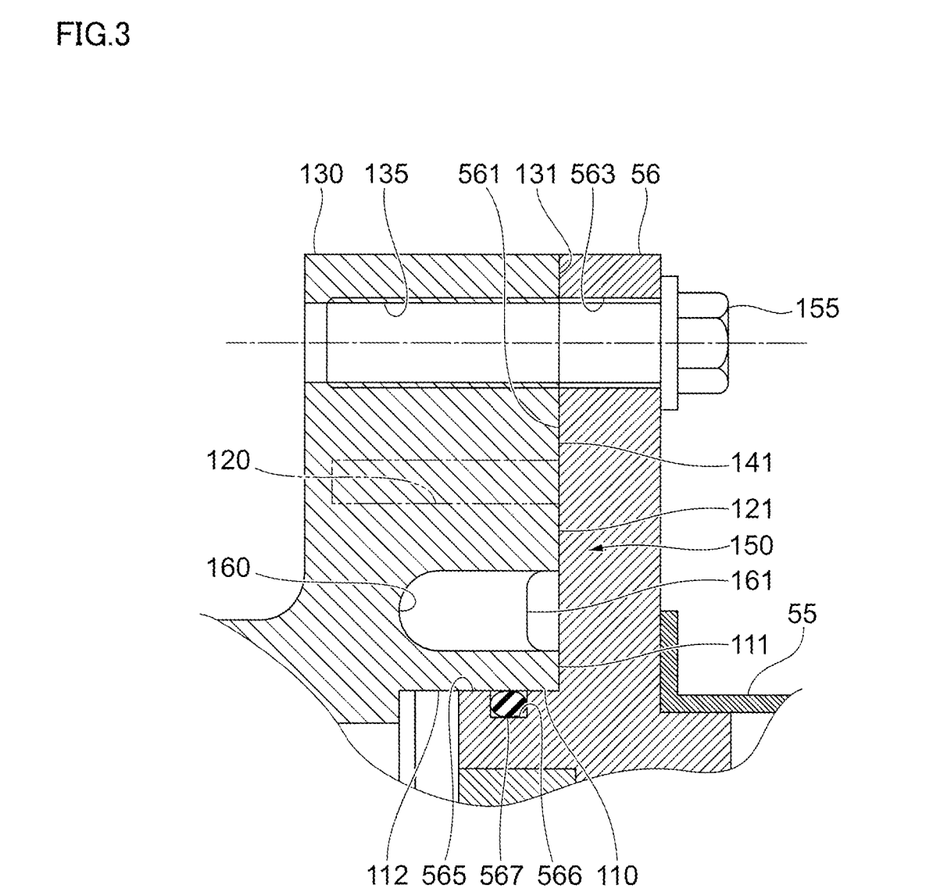
FIG. 3 is an enlarged view of a part III in FIG. 2.

FIG. 3 is an enlarged view of a part III in FIG. 2.

Figure 4:
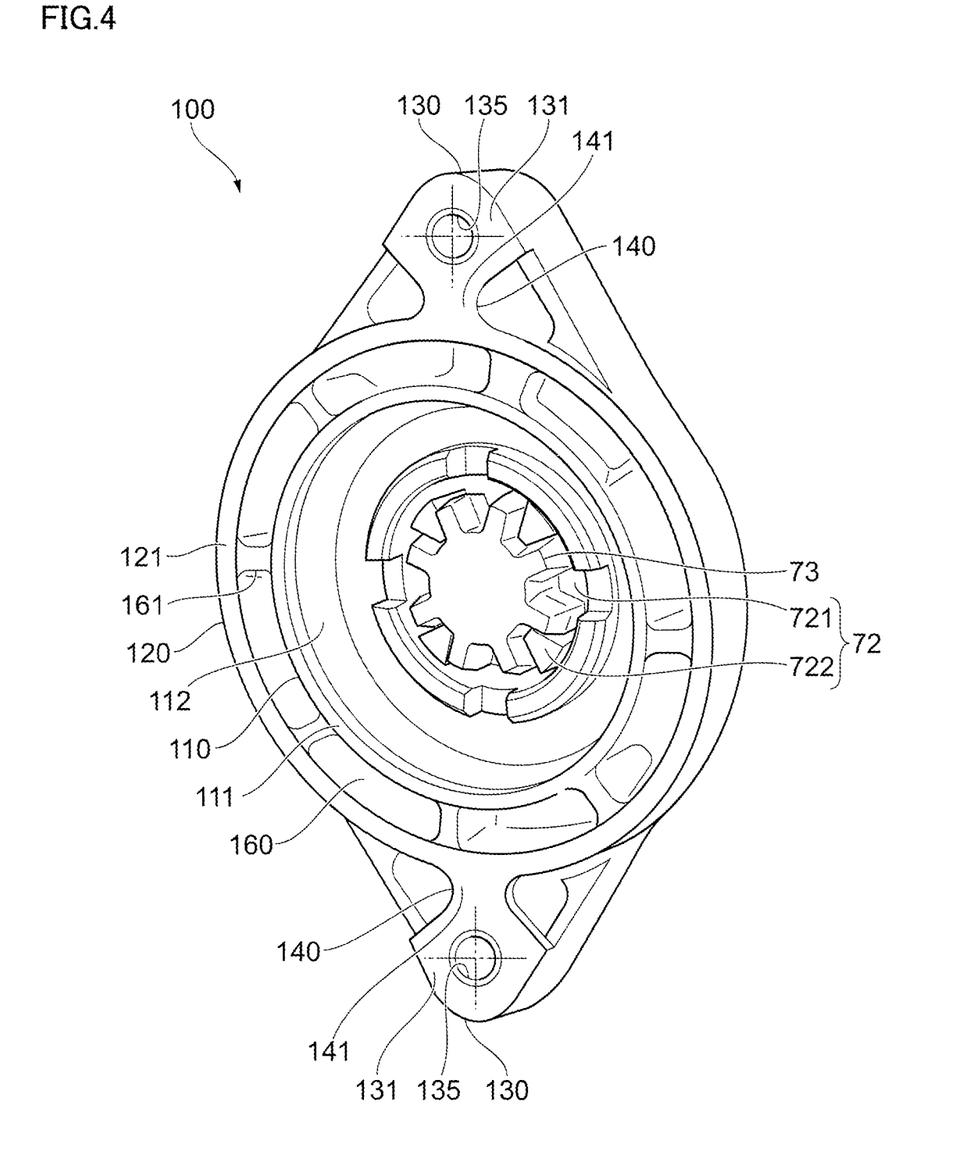
FIG. 4 is a perspective view of a support portion of a second housing according to the first embodiment.

FIG. 4 is a perspective view of a support portion 100 of a second housing 32 according to the first embodiment.

Figure 5:
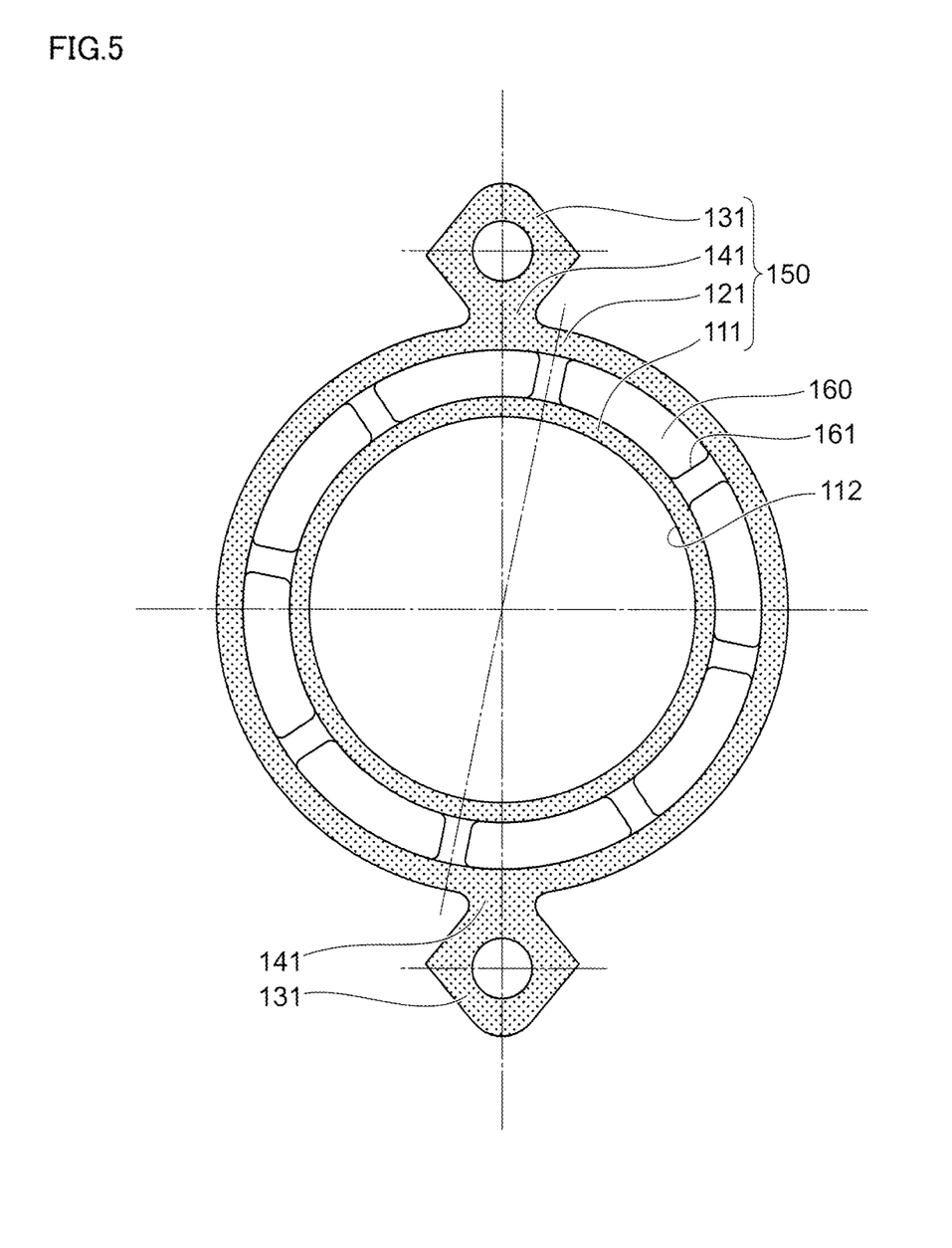
FIG. 5 depicts a housing-side contact surface according to the first embodiment, as viewed in an axial direction.

FIG. 5 depicts a housing-side contact surface 150 according to the first embodiment, as viewed in an axial direction.

The electric power steering device 1 (hereinafter may be simply referred to as a "steering device") according to the first embodiment is a steering device for changing a traveling direction of a vehicle to any direction, as shown in FIG. 1. The steering device 1 is a so-called double-pinion type power steering device.

The steering device 1 includes tie rods (not shown) respectively coupled to left and right wheels (not shown) as rolling wheels via a knuckle arm (not shown), and a rack shaft 3 coupled to the tie rods. The steering device 1 further includes a transmission mechanism 10 that transmits a steering force from a steering wheel (not shown) provided in the vehicle to the rack shaft 3. The steering device 1 further includes an assist unit 20 that includes an electric motor 50 and assists movement of the rack shaft 3 by transmitting a driving force of the electric motor 50 to the rack shaft 3 as a steering assist force.

The steering device 1 further includes a housing 30. The housing 30 surrounds a part of an outer peripheral surface of the rack shaft 3 and supports the rack shaft 3 such that the rack shaft 3 can move in an axial direction. The housing 30 also supports the electric motor 50. The housing 30 includes a first housing 31, a second housing 32, and a cover 33; the first housing 31 accommodates a part of the rack shaft 3, the second housing 32 covers a periphery of a reducing unit 60 (described later) and includes a support portion 100 for supporting the electric motor 50, and the cover 33 covers an opening of the second housing 32.

The transmission mechanism 10 includes a pinion shaft (not shown) formed with a pinion constituting a rack and pinion mechanism with a rack formed on the rack shaft 3, and an input shaft 12 to which a steering force from the steering wheel (not shown) is input. The transmission mechanism 10 further includes a torque sensor (not shown) detecting steering torque of the steering wheel based on relative rotational angles of the pinion shaft and the input shaft 12.

The assist unit 20 includes a pinion shaft 21 formed with a pinion constituting a rack and pinon mechanism with the rack formed on the rack shaft 3. The assist unit 20 further includes the electric motor 50, the reducing unit 60 for reducing a rotational speed of the electric motor 50, and a shaft joint 70 for transmitting a rotational driving force of the electric motor 50 to the reducing unit 60.

The reducing unit 60 includes a worm wheel 61 and a worm 62 that constitute a worm gear. The worm 62 is a cylindrical worm as a screw gear. The worm wheel 61 is held by the pinion shaft 21.

The shaft joint 70 includes a motor-side member 71 held by an output shaft 51 of the electric motor 50, a worm-side member 72 held by the worm 62 of the reducing unit 60, and an elastic member 73 between the motor-side member 71 and the worm-side member 72.

The motor-side member 71 is made of metal and includes a motor-side member fitting portion 711 and motor-side protrusions 712. The motor-side member fitting portion 711 is fitted with a distal end of the output shaft 51 of the electric motor 50. The motor-side protrusions 712 are provided around the motor-side member fitting portion 711 and protrude toward the worm-side member 72. The motor-side protrusions 712 are provided at four positions at equal intervals in the rotational direction, and each of the motor-side protrusions 712 has a triangular prism shape with its columnar direction coinciding with the axial direction of the output shaft 51.

The worm-side member 72 is made of metal and includes a worm-side member fitting portion 721 and worm-side protrusions 722. The worm-side member fitting portion 721 is fitted with a distal end of the worm 62 of the reducing unit 60. The worm-side protrusions 722 are provided around the worm-side member fitting portion 721 and protrude toward the motor-side member 71. Similarly to the motor-side protrusions 712, the worm-side protrusions 722 are provided at four positions at equal intervals in the rotational direction, and each of the worm-side protrusions 722 has a triangular prism shape with its columnar direction coinciding with the axial direction of the worm 62 (see FIG. 3).

The elastic member 73 is made of rubber such as ethylene-propylene rubber and includes eight radial protrusions protruding radially from an outer peripheral surface of a columnar portion of the elastic member 73 (see FIG. 3).

(Details of the Electric Motor 50 and the Support Portion 100 of the Second Housing 32)

The electric motor 50 is a known brushless motor and, as shown in FIG. 2, includes a magnet 52 attached to the output shaft 51, an iron core 53, winding 54, and a frame 55 accommodating the magnet 52, the iron core 53, and the winding 54. The electric motor 50 further includes a bracket 56 holding the frame 55. The frame 55 and the bracket 56 respectively include a bearing 57 and a bearing 58 that rotatably support the output shaft 51.

The bracket 56 is formed, at its one end in the axial direction, with a bracket-side contact surface 561 that is a mating surface for mating with a housing-side contact surface 150 (described later) formed on the support portion 100 of the second housing 32. The bracket 56 is also formed, at its other end in the axial direction, a mounting surface 562 on which the frame 55 is mounted. The bracket 56 further includes a through-hole 563 for insertion of a bolt 155 to mount the electric motor 50 on the support portion 100 of the second housing 32, and an insertion portion 564 protruding in the axial direction toward the support portion 100 relative to the bracket-side contact surface 561 and inserted into the support portion 100.

The insertion portion 564 includes an outer peripheral surface 565 parallel to the axial direction. The outer peripheral surface 565 is formed with a groove 566 depressed from the outer peripheral surface 565 over the entire circumference thereof. The groove 566 is fitted with an O-ring 567.

The support portion 100 includes a first cylindrical portion 110 into which the insertion portion 564 of the bracket 56 of the electric motor 50 is inserted, and a second cylindrical portion 120 provided radially outside of the first cylindrical portion 110. Centerlines of the cylindrical shapes of the first cylindrical portion 110 and the second cylindrical portion 120 coincide with the rotational axis of the worm 62. The support portion 100 includes two cylindrical bosses 130 each internally formed with a female thread 135 therein; the two bosses 130 are located radially outside of the second cylindrical portion 120. The support portion 100 includes two connecting portions 140 each connecting the corresponding boss 130 and the second cylindrical portion 120.

The first cylindrical portion 110 includes, at its end in the axial direction, a first annular surface 111 that is a planar surface perpendicular to the axial direction.

The second cylindrical portion 120 includes, at its end in the axial direction, a second annular surface 121 that is a planar surface perpendicular to the axial direction.

The boss 130 includes, at its end in the axial direction, a third annular surface 131 that is a planar surface perpendicular to the axial direction.

The connecting portion 140 includes, at its end in the axial direction, a connecting surface 141 that is a planar surface perpendicular to the axial direction. The connecting surface 141 is provided on a straight line connecting the center of the female thread 135 and the rotation center of the worm 62.

In the support portion 100 of the first embodiment, the first annular surface 111, the second annular surface 121, the third annular surface 131, and the connecting surface 141 are machined such that their positions in the axial direction are the same. Hereinafter, the first annular surface 111, the second annular surface 121, the third annular surface 131, and the connecting surface 141 may be collectively referred to as a "housing-side contact surface 150" for contact with the bracket-side contact surface 561 of the bracket 56. Dotted areas in FIG. 5 correspond to the housing-side contact surface 150.

The electric motor 50 is mounted on the housing 32 by the bolt 155 passed through the through-hole 563 being tightened to the female thread 135 formed in the boss 130 in the state where the bracket-side contact surface 561 of the bracket 56 is in contact with the housing-side contact surface 150 of the support portion 100 of the second housing 32.

As the third annular surface 131 and the second annular surface 121 are connected via the connecting surface 141 in the housing-side contact surface 150, the third annular surface 131, the connecting surface 141, and the second annular surface 121 are coplanar with no boundaries therebetween.

On the other hand, while the first annular surface 111 and the second annular surface 121 are at the same axial position, they are not connected to each other and a recess 160 depressed from these surfaces is formed between these surfaces. The recess 160 is provided with multiple ribs 161 in the circumferential direction. Each rib 161 connects an outer periphery of the first cylindrical portion 110 and an inner periphery of the second cylindrical portion 120. An axial end of the rib 161 is located farther from the electric motor 50 than the second annular surface 121 is.

The first cylindrical portion 110 includes an inner peripheral surface 112 parallel to the axial direction. The insertion portion 564 of the bracket 56 of the electric motor 50 is inserted inside the inner peripheral surface 112. The O-ring 567 fitted in the groove 566 deforms in contact with the inner peripheral surface 112 and thus contacts the inner peripheral surface 112 and the insertion portion 564 of the bracket 56, whereby a gap between the second housing 32 and the bracket 56 is sealed.

The above-configured steering device 1 includes the housing-side contact surface 150 (the third annular surface 131, the connecting surface 141, the second annular surface 121, and the first annular surface 111) as an example of the first planar surface and includes the housing 30 accommodating a part of the rack shaft 3. The steering device 1 further includes a bracket-side contact surface 561 as an example of the second planar surface and includes the bracket 56 supporting the output shaft 51 as an example of the rotary shaft. The steering device 1 further includes the bolt 155 as an example of the tightening member to tighten the housing 30 and the bracket 56 in the state where the third annular surface 131 of the housing 30 is mated with the bracket-side contact surface 561 of the bracket 56. The steering device 1 further includes the O-ring 567 as an example of the sealing member to provide sealing between the housing 30 and the bracket 56 at a position that is closer to the output shaft 51 than the bolt 155 is.

In the above steering device 1, the housing-side contact surface 150 is formed with the recess 160 depressed from the housing-side contact surface 150 between the bolt 155 and the O-ring 567.

In the above-configured steering device 1, the housing 30 is formed with the recess 160 depressed from the housing-side contact surface 150, and a gap between the bracket-side contact surface 561 and the recess 160 is larger than a gap between the housing-side contact surface 150 and the bracket-side contact surface 561. This prevents external water having entered a gap between the bracket-side contact surface 561 and the third annular surface 131 from intruding by capillary action into a gap between the inner peripheral surface 112 of the first cylindrical portion 110 and the outer peripheral surface 565 of the insertion portion 564 of the bracket 56 inside the first cylindrical portion 110 of the housing 30 and also prevents corrosion products from migrating. Likewise, this prevents external water having entered a gap between the bracket-side contact surface 561 and the second annular surface 121 from intruding by capillary action into a gap between the inner peripheral surface 112 of the first cylindrical portion 110 and the outer peripheral surface 565 of the insertion portion 564 of the bracket 56 inside the first cylindrical portion 110 and also prevents corrosion products from migrating.

Figure 6:
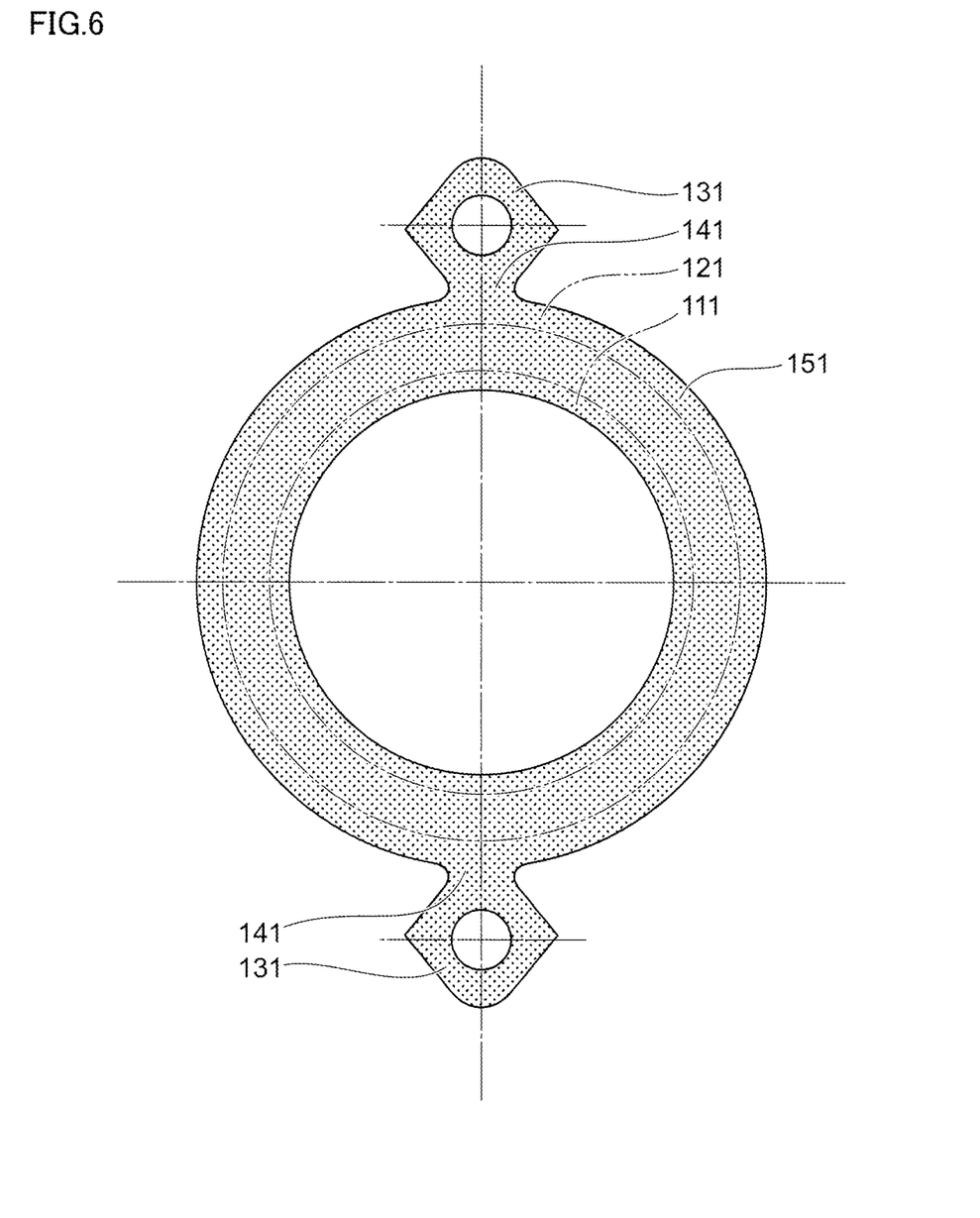
FIG. 6 depicts a housing-side contact surface according to a comparative example, as viewed in the axial direction.

This will be discussed below in comparison with a housing-side contact surface 151 according to a comparative example.

FIG. 6 depicts the housing-side contact surface 151 according to the comparative example, as viewed in the axial direction.

The housing-side contact surface 151 according to the comparative example is configured such that, unlike the housing-side contact surface 150 of the above embodiment, the housing-side contact surface 151 is not formed with the recess 160 depressed from the housing-side contact surface 151 between the bolt 155 and the O-ring 567, and the first annular surface 111 and the second annular surface 121 are coplanar with no boundary between them. A dotted area in FIG. 6 corresponds to the housing-side contact surface 151. In the case of the housing-side contact surface 151 according to the comparative example, a gap between the housing-side contact surface 151 and the bracket-side contact surface 561 of the bracket 56 of the electric motor 50 is almost constant from the third annular surface 131 around the bolt 155 to the first annular surface 111. As the bolt 155 is tightened to the female thread 135 in the boss 130 with the housing-side contact surface 151 of the comparative example being in contact with the bracket-side contact surface 561, these contact surfaces contact each other. However, since surface roughness of these contact surfaces is not zero, there is minor unevenness on each of the surfaces. Hence, there is a possibility of a gap being formed between the housing-side contact surface 151 and the bracket-side contact surface 561 due to unevenness on these surfaces. If a gap is formed between the contact surfaces, water may enter from outside of the housing 30 and the bracket 56 and reach inside the first cylindrical portion 110 of the housing 30 by capillary action through the gap between the contact surfaces. Additionally, for example, corrosion products generated after salt spray mist may reach the portion sealed by the O-ring 567 and erode into the first cylindrical portion 110 of the housing 30.

In contrast, in the present embodiment, the housing 30 is formed with the recess 160, and the gap between the bracket-side contact surface 561 and the recess 160 is larger than the gap between the housing-side contact surface 150 and the bracket-side contact surface 561. Thus, water hardly reaches the first annular surface 111. As a result, the present embodiment prevents growth of rust that may otherwise occur due to water entering the gap between the inner peripheral surface 112 of the housing 30 and the outer peripheral surface 565 of the bracket 56 or due to corrosion products being generated in the gap. The present embodiment also prevents the rust from causing deterioration of the sealing performance of the O-ring 567 between the housing 30 and the bracket 56 that may in turn cause entry of water or further migration of corrosion products into the electric motor 50 or the housing 30 through a gap between the O-ring 567 and the housing 30 or a gap between the O-ring 567 and the bracket 56. As a minimum requirement, the bracket-side contact surface 561 and the recess 160 do not contact each other while the housing-side contact surface 150 and the bracket-side contact surface 561 contact each other.

In the present embodiment, the recess 160 is provided with the multiple ribs 161 arranged in the circumferential direction each connecting the outer periphery of the first cylindrical portion 110 and the inner periphery of the second cylindrical portion 120. This avoids an excessive decrease in rigidity of the first cylindrical portion 110, into which the insertion portion 564 of the bracket 56 is inserted, due to providing the recess 160 depressed from the housing-side contact surface 150. Since the axial end of each rib 161 is not in contact with the bracket-side contact surface 561, water hardly reaches the first annular surface 111 even when the ribs 161 are provided.

In the above embodiment, out of the housing-side contact surface 150 and the bracket-side contact surface 561 mated with each other for tightening with the bolt 155, the recess 160 is formed in the housing-side contact surface 150 so as to be depressed therefrom. The present invention is, however, not limited to this embodiment. For example, in addition to the recess 160, a recess depressed from the bracket-side contact surface 561 may be formed in the bracket 56. Alternatively, a recess depressed from the bracket-side contact surface 561 may be formed in the bracket 56 without forming the recess 160 depressed from the housing-side contact surface 150. In these cases, by way of example, the recess depressed from the bracket-side contact surface 561 may be at the same position as the recess 160 when viewed in the axial direction.

Second Embodiment

Figure 7:
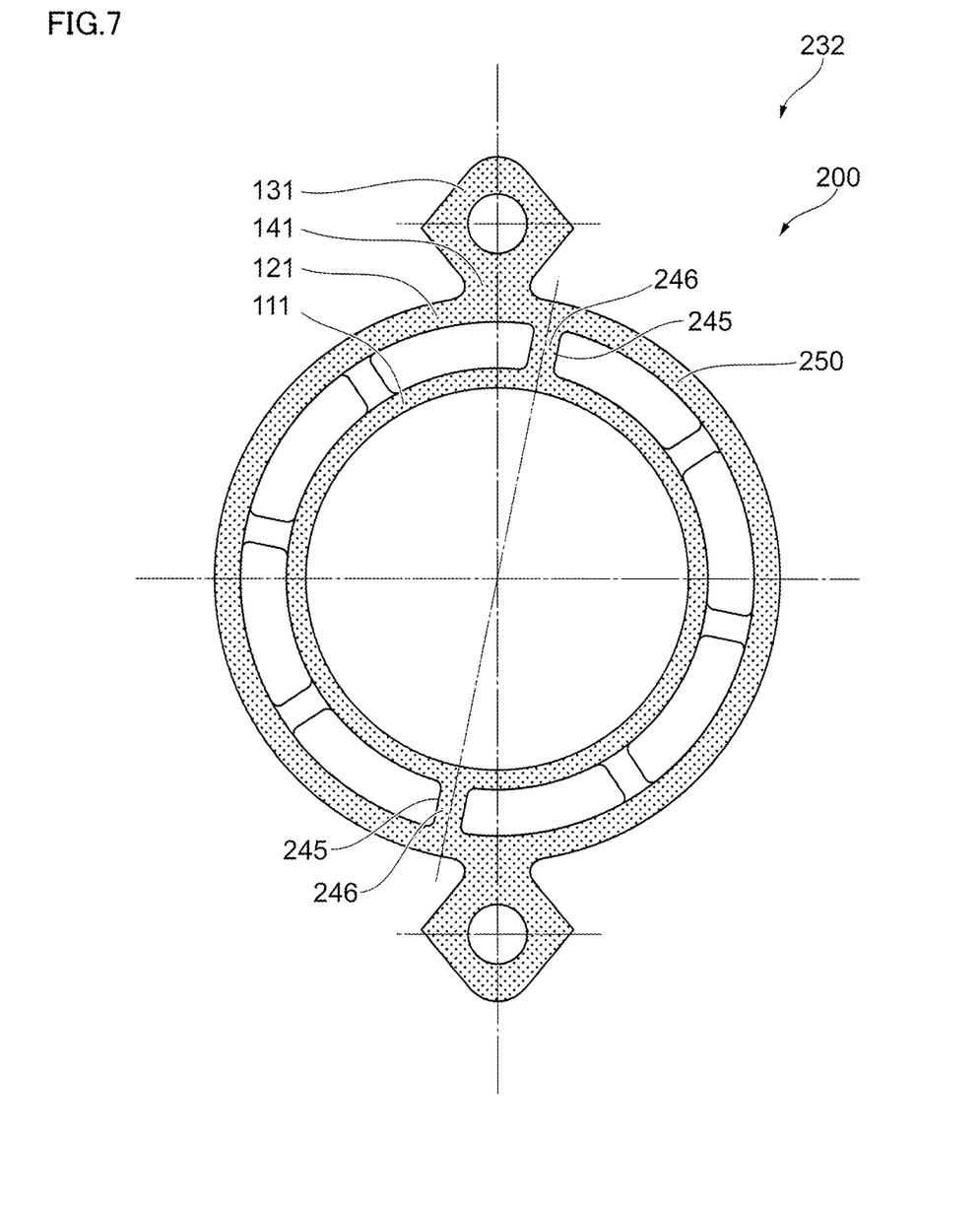
FIG. 7 depicts a housing-side contact surface according to the second embodiment, as viewed in the axial direction.

FIG. 7 depicts a housing-side contact surface 250 according to the second embodiment, as viewed in the axial direction.

A support portion 200 of a second housing 232 according to the second embodiment differs from the support portion 100 of the second housing 32 according to the first embodiment in its portion corresponding to the housing-side contact surface 150. Below a description will be given of differences from the support portion 100 of the second housing 32. The same structures and functions between the support portion 200 of the second housing 232 and the support portion 100 of the second housing 32 are denoted by the respective same reference numerals and detailed description thereof will be omitted.

Besides the ribs 161, the support portion 200 of the second housing 232 according to the second embodiment includes connecting portions 245 in the recess 160 each connecting the outer periphery of the first cylindrical portion 110 and the inner periphery of the second cylindrical portion 120. The connecting portion 245 includes, at its axial end, a connecting surface 246 that is a planar surface perpendicular to the axial direction.

In the support portion 200 of the second embodiment, the first annular surface 111, the second annular surface 121, the third annular surface 131, the connecting surface 141, and the connecting surface 246 are machined such that their positions in the axial direction are the same. Hereinafter, the first annular surface 111, the second annular surface 121, the third annular surface 131, the connecting surface 141, and the connecting surface 246 may be collectively referred to as a "housing-side contact surface 250" for contact with the bracket-side contact surface 561 of the bracket 56. A dotted area in FIG. 7 corresponds to the housing-side contact surface 250.

In the housing-side contact surface 250, the first annular surface 111 and the second annular surface 121 are connected via the connecting surface 246. Thus, the connecting surface 246 and the first annular surface 111 are coplanar with no boundary therebetween. Also, the connecting surface 246 and the second annular surface 121 are coplanar with no boundary therebetween.

However, a position of the connecting surface 246 is shifted in circumferential phase from the position of the connecting surface 141. Hence, while the connecting surface 141 is provided on the straight line connecting the center of the female thread 135 and the rotation center of the worm 62, the connecting surface 246 is not provided on this straight line. In other words, while the third annular surface 131, the connecting surface 141, and the second annular surface 121 are linearly connected to each other, they are not linearly connected to the connecting surface 246 and the first annular surface 111.

Thus, the housing-side contact surface 250 is formed with the recess 160 depressed therefrom between the bolt 155 and the O-ring 567.

The above-configured support portion 200 of the second housing 232 is formed with the recess 160 depressed from the housing-side contact surface 250, and a gap between the bracket-side contact surface 561 and the recess 160 is larger than a gap between the housing-side contact surface 250 and the bracket-side contact surface 561. This prevents external water having entered a gap between the bracket-side contact surface 561 and the third annular surface 131 from intruding by capillary action into a gap between the inner peripheral surface 112 of the first cylindrical portion 110 and the outer peripheral surface 565 of the insertion portion 564 of the bracket 56 inside the first cylindrical portion 110 of the housing 30 and also prevents corrosion products from migrating. As a result, this embodiment prevents growth of rust that may otherwise occur due to water entering the gap between the inner peripheral surface 112 of the housing 30 and the outer peripheral surface 565 of the bracket 56 or due to corrosion products being generated in the gap. This embodiment also prevents the rust from causing deterioration of the sealing performance of the O-ring 567 between the housing 30 and the bracket 56 that may in turn cause entry of water or further migration of corrosion products into the electric motor 50 or the housing 30 through a gap between the O-ring 567 and the housing 30 or a gap between the O-ring 567 and the bracket 56.

As the recess 160 is provided with the connecting portion 245 in addition to the ribs 161, the first cylindrical portion 110 can have increased rigidity in the second embodiment.

Note that a larger number of connecting surfaces 246 may be provided as long as their positions are shifted in circumferential phase from the position of the connecting surface 141.

Third Embodiment

Figure 8:
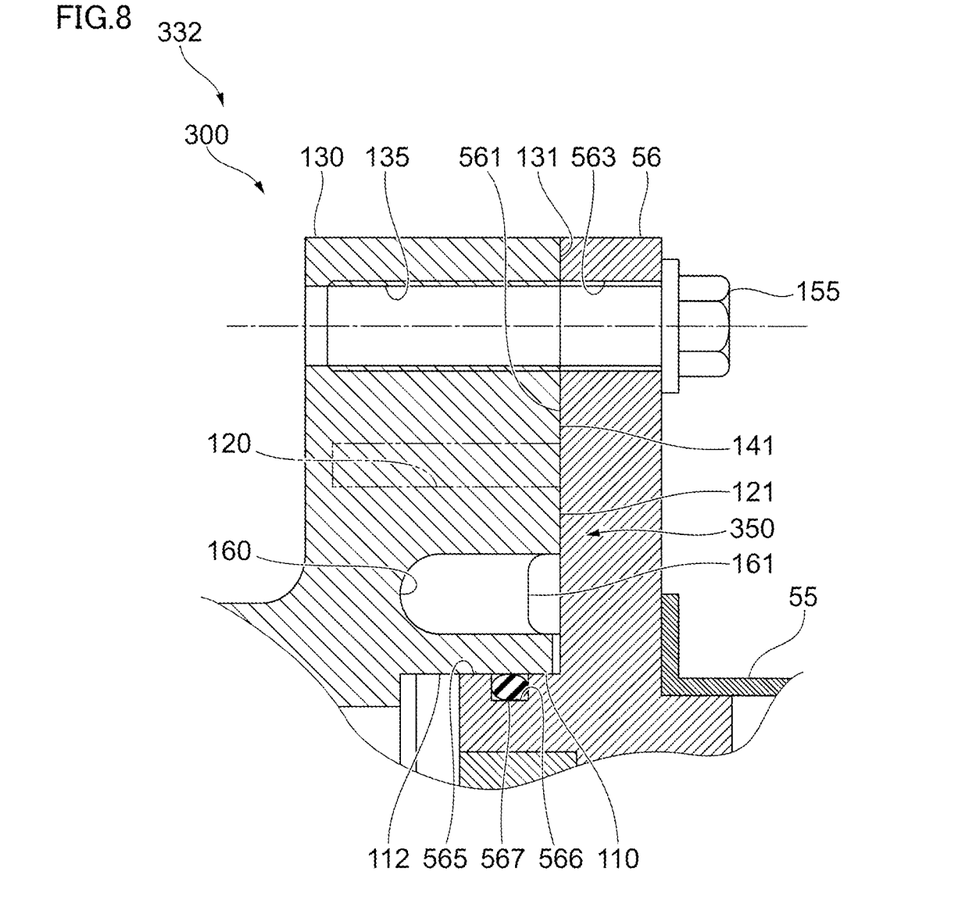
FIG. 8 is a sectional view of a second housing according to the third embodiment.

FIG. 8 is a sectional view of a second housing 332 according to the third embodiment.

A support portion 300 of the second housing 332 according to the third embodiment differs from the support portion 100 of the second housing 32 according to the first embodiment in its portion corresponding to the housing-side contact surface 150. Below a description will be given of differences from the support portion 100 of the second housing 32. The same structures and functions between the support portion 300 of the second housing 332 and the support portion 100 of the second housing 32 are denoted by the respective same reference numerals and detailed description thereof will be omitted.

In the support portion 300 of the second housing 332, the axial end of the first cylindrical portion 110 is located farther from the electric motor 50 than the axial positions of the second annular surface 121, the third annular surface 131, and the connecting surface 141. The end of the first cylindrical portion 110 may be machined or may not be machined.

In the support portion 300 of the third embodiment, the second annular surface 121, the third annular surface 131, and the connecting surface 141 constitute a housing-side contact surface 350 for contact with the bracket-side contact surface 561 of the bracket 56.

In the support portion 300 of the second housing 332 of the third embodiment, a gap between the bracket-side contact surface 561 and the recess 160 is larger than a gap between the housing-side contact surface 350 and the bracket-side contact surface 561. This prevents external water having entered a gap between the bracket-side contact surface 561 and the third annular surface 131 from intruding by capillary action into a gap between the inner peripheral surface 112 of the first cylindrical portion 110 and the outer peripheral surface 565 of the insertion portion 564 of the bracket 56 inside the first cylindrical portion 110 of the housing 30 and also prevents corrosion products from migrating. As a result, this embodiment prevents growth of rust that may otherwise occur due to water entering the gap between the inner peripheral surface 112 of the housing 30 and the outer peripheral surface 565 of the bracket 56 or due to corrosion products being generated in the gap. This embodiment also prevents the rust from causing deterioration of the sealing performance of the O-ring 567 between the housing 30 and the bracket 56 that may in turn cause entry of water or further migration of corrosion products into the electric motor 50 or the housing 30 through a gap between the O-ring 567 and the housing 30 or a gap between the O-ring 567 and the bracket 56.

As the axial end of the first cylindrical portion 110 does not coincide with the axial positions of the second annular surface 121, the third annular surface 131, and the connecting surface 141 (the housing-side contact surface 350) but is located farther from the electric motor 50 than these surfaces, machining is only required to be performed on regions of the second annular surface 121, the third annular surface 131, and the connecting surface 141. This allows for easier formation of the housing-side contact surface 350 by machining than forming the housing-side contact surface 150 of the first embodiment by machining.

Fourth Embodiment

Figure 9:
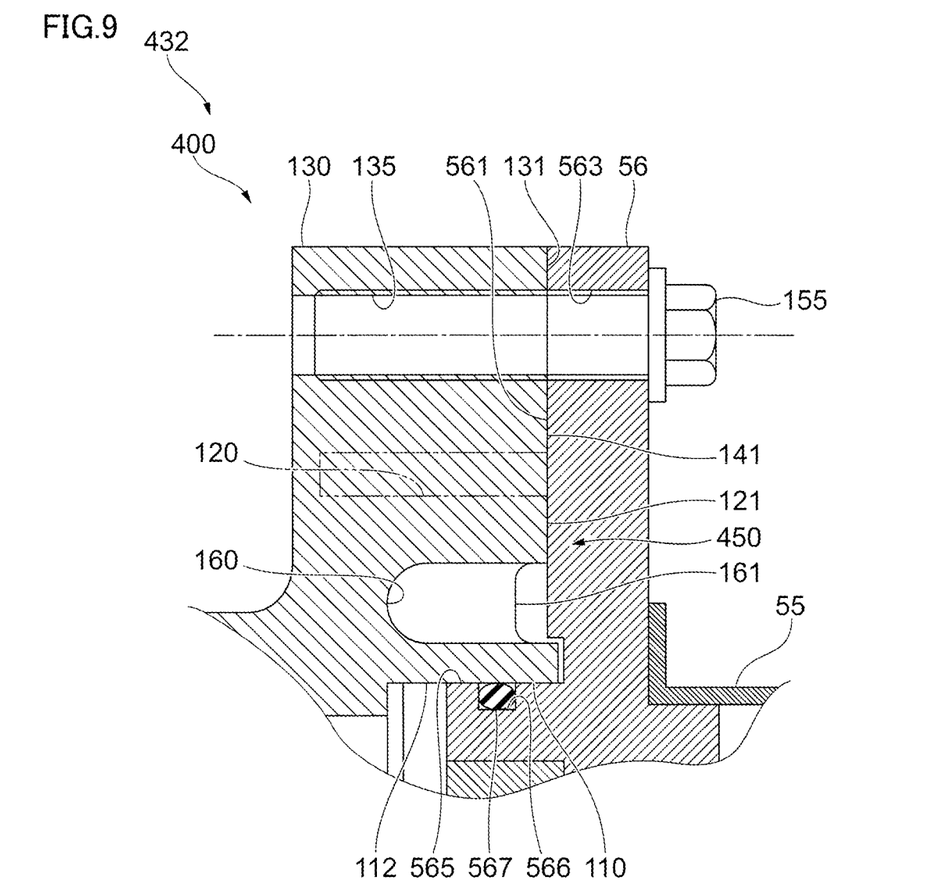
FIG. 9 is a sectional view of a second housing according to the fourth embodiment.

FIG. 9 is a sectional view of a second housing 432 according to the fourth embodiment.

A support portion 400 of the second housing 432 according to the fourth embodiment differs from the support portion 100 of the second housing 32 according to the first embodiment in its portion corresponding to the housing-side contact surface 150. Below a description will be given of differences from the support portion 100 of the second housing 32. The same structures and functions between the support portion 400 of the second housing 432 and the support portion 100 of the second housing 32 are denoted by the respective same reference numerals and detailed description thereof will be omitted.

In the support portion 400 of the second housing 432, the axial end of the first cylindrical portion 110 is located more proximal to the electric motor 50 than the axial positions of the second annular surface 121 are, the third annular surface 131 are, and the connecting surface 141 are. The end of the first cylindrical portion 110 may be machined or may not be machined.

A part of the bracket 56 around the insertion portion 564 is recessed to receive the end of the first cylindrical portion 110 of the second housing 432.

In the support portion 400 of the fourth embodiment, the second annular surface 121, the third annular surface 131, and the connecting surface 141 constitute a housing-side contact surface 450 for contact with the bracket-side contact surface 561 of the bracket 56.

In the support portion 400 of the second housing 432 of the fourth embodiment, a gap between the bracket-side contact surface 561 and the recess 160 is larger than a gap between the housing-side contact surface 450 and the bracket-side contact surface 561. This prevents external water having entered a gap between the bracket-side contact surface 561 and the third annular surface 131 from intruding by capillary action into a gap between the inner peripheral surface 112 of the first cylindrical portion 110 and the outer peripheral surface 565 of the insertion portion 564 of the bracket 56 inside the first cylindrical portion 110 of the housing 30 and also prevents corrosion products from migrating. Additionally, in the support portion 400 of the fourth embodiment, the axial end of the first cylindrical portion 110 is located more proximal to the electric motor 50 than the axial positions of the second annular surface 121, the third annular surface 131, and the connecting surface 141 (the housing-side contact surface 450) are. Thus, even if water enters from outside of the housing 30 and the bracket 56 and reaches near the first cylindrical portion 110 through a gap between the contact surfaces or corrosion products migrate near the first cylindrical portion 110 through the gap, the axial end of the first cylindrical portion 110 prevents the water or the corrosion products from entering inside the first cylindrical portion 110 over the axial end. As a result, this embodiment prevents growth of rust that may otherwise occur due to water entering the gap between the inner peripheral surface 112 of the housing 30 and the outer peripheral surface 565 of the bracket 56 or due to corrosion products from generated in the gap. This embodiment also prevents the rust from causing deterioration of the sealing performance of the O-ring 567 between the housing 30 and the bracket 56 that may in turn cause entry of water or further migration of corrosion products into the electric motor 50 or the housing 30 through a gap between the O-ring 567 and the housing 30 or a gap between the O-ring 567 and the bracket 56.

While in the above electric motor 50, the bracket 56 directly supports the output shaft 51 via the bearing 58, the present invention is not limited to this embodiment. For example, a component coupled to the bracket 56 may hold the bearing 58 and indirectly support the output shaft 51 via the bearing 58.

Also, the structure of the electric motor 50 is not limited to that shown in FIG. 2. The electric motor 50 may integrally include a controller to determine a control amount (e.g., electric current) for the electric motor 50 using output values from the above torque sensor (not shown) and include an inverter and the like.

REFERENCE SIGNS LIST

1 Steering device
3 Rack shaft
10 Transmission mechanism
20 Assist unit
30 Housing
32, 232, 332, 432 Second housing
50 Electric motor 56 Bracket
100, 200, 300, 400 Support portion
150, 250, 350, 450 Housing-side contact surface
561 Bracket-side contact surface

The invention claimed is:

1. A steering device comprising:
a housing including a first planar surface, the housing being configured to accommodate a part of a rack shaft;
an electric motor including a second planar surface facing the first planar surface, the electric motor including a bracket configured to support a rotary shaft;
a tightening member configured to tighten the housing and the bracket in a state where the first planar surface and the second planar surface are mated; and
a sealing member configured to provide sealing between the housing and the bracket at a position that is closer to the rotary shaft than the tightening member is, wherein
at least one of the first planar surface and the second planar surface is formed with a recess located between the tightening member and the sealing member and depressed from the at least one of the first planar surface and the second planar surface,
the bracket includes an outer peripheral surface, the outer peripheral surface being formed with a groove configured to be fitted with the sealing member,
the housing includes an inner peripheral surface facing the outer peripheral surface,
the first planar surface includes a first annular surface and a second annular surface, the first annular surface being formed at an end of a first cylindrical portion of the housing in an axial direction of the rotary shaft, the first cylindrical portion including the inner peripheral surface on an inner periphery thereof, the second annular surface being formed at an end of a second cylindrical portion of the housing in the axial direction, the second cylindrical portion being located closer to the tightening member than the first cylindrical portion is,
the recess is formed between the first annular surface and the second annular surface, and
the housing includes a rib in the recess, the rib being configured to connect an outer periphery of the first cylindrical portion and an inner periphery of the second cylindrical portion.

2. The steering device according to claim 1, wherein
the first planar surface includes a third annular surface and a first connecting surface, the third annular surface being of an annular shape and formed around the tightening member, the first connecting surface being configured to connect the second annular surface and the third annular surface.

3. The steering device according to claim 2, wherein
the first planar surface includes a second connecting surface configured to connect the first annular surface and the second annular surface, and
the first connecting surface and the second connecting surface are displaced from each other in a rotational direction of the rotary shaft.

4. A steering device comprising:
a housing including a first planar surface and an inner peripheral surface, the housing being configured to accommodate a part of a rack shaft;
an electric motor including a second planar surface and an outer peripheral surface respectively facing the first planar surface and the inner peripheral surface, the electric motor including a bracket configured to support a rotary shaft; and
a tightening member configured to tighten the housing and the bracket in a state where the first planar surface and the second planar surface are mated, wherein
a gap larger than a gap between the first planar surface and the second planar surface is formed between a tightened portion and a first cylindrical portion of the housing, the tightened portion being a portion composed of the first planar surface and the second planar surface and tightened by the tightening member, the first cylindrical portion including the inner peripheral surface of the housing on an inner periphery thereof, and
an end of the first cylindrical portion in an axial direction of the rotary shaft protrudes toward the second planar surface relative to the first planar surface.

5. The steering device according to claim 4, wherein
the first planar surface includes one annular surface formed at an end of a second cylindrical portion of the housing in the axial direction of the rotary shaft, the second cylindrical portion being located closer to the tightening member than the first cylindrical portion, and
the housing includes a recess located between the first cylindrical portion and the second cylindrical portion and depressed away from the second planar surface relative to the first planar surface.

6. The steering device according to claim 5, wherein
the housing includes a rib in the recess, the rib being configured to connect an outer periphery of the first cylindrical portion and an inner periphery of the second cylindrical portion.

7. The steering device according to claim 5, wherein
the first planar surface includes another annular surface and a first connecting surface, the other annular surface being of an annular shape and formed around the tightening member, the first connecting surface being configured to connect the one annular surface and the other annular surface.

8. The steering device according to claim 7, wherein
the first planar surface includes a second connecting surface configured to connect the one annular surface and the first cylindrical portion, and
the first connecting surface and the second connecting surface are displaced from each other in a rotational direction of the rotary shaft.

9. The steering device according to claim 6, wherein
the first planar surface includes another annular surface and a first connecting surface, the other annular surface being of an annular shape and formed around the tightening member, the first connecting surface being configured to connect the one annular surface and the other annular surface.

10. The steering device according to claim 9, wherein
the first planar surface includes a second connecting surface configured to connect the one annular surface and the first cylindrical portion, and
the first connecting surface and the second connecting surface are displaced from each other in a rotational direction of the rotary shaft.

* * * * *